US012258259B2

(12) United States Patent
Pugliese et al.

(10) Patent No.: US 12,258,259 B2
(45) Date of Patent: Mar. 25, 2025

(54) BEVERAGE DISPENSER CONNECTOR, BEVERAGE PRODUCTION DEVICE AND METHOD FOR BEVERAGE PRODUCTION

(71) Applicant: SOCIETE DES PRODUITS NESTLE S.A., Vevey (CH)

(72) Inventors: Alexandre Pugliese, Paudex (CH); Alexandre Perentes, Sullens (CH); Antonin Lizon, Morges (CH); Thomas Gabella, Lausanne (CH)

(73) Assignee: SOCIÉTÉ DES PRODUITS NESTLÉ S.A., Vevey (CH)

( * ) Notice: Subject to any disclaimer, the term of this patent is extended or adjusted under 35 U.S.C. 154(b) by 104 days.

(21) Appl. No.: 17/906,516

(22) PCT Filed: Mar. 23, 2021

(86) PCT No.: PCT/EP2021/057336

§ 371 (c)(1),
(2) Date: Sep. 16, 2022

(87) PCT Pub. No.: WO2021/191173

PCT Pub. Date: Sep. 30, 2021

(65) Prior Publication Data

US 2023/0242392 A1 Aug. 3, 2023

(30) Foreign Application Priority Data

Mar. 27, 2020 (EP) .................................... 20166172

(51) Int. Cl.
*B67D 3/00* (2006.01)
*B67D 1/07* (2006.01)
*B67D 1/00* (2006.01)

(52) U.S. Cl.
CPC ............ *B67D 3/0029* (2013.01); *B67D 1/07* (2013.01); *B67D 3/0012* (2013.01);
(Continued)

(58) Field of Classification Search
None
See application file for complete search history.

(56) References Cited

U.S. PATENT DOCUMENTS 9,480,361 B2 * 11/2016 Ozanne ................ A47J 31/461
11,247,838 B2 * 2/2022 Cedergren ........... B65D 47/043
(Continued)

FOREIGN PATENT DOCUMENTS

EP 2017221 1/2009
JP 2006027661 2/2006
(Continued)

*Primary Examiner* — Thor S Campbell
(74) *Attorney, Agent, or Firm* — K&L Gates LLP

(57) ABSTRACT

The present invention is directed to a beverage dispenser connector (1) comprising a dispenser body (2) defining a cavity (3) with an opening (4) to be open at a side of the dispenser body (2), a connection section (6) to attached the dispenser body (2) with the open cavity (3) over a delivery section (102) of a container (100) to close the cavity (3) with the delivery section (102), an inlet (7) to deliver a fluid into the cavity (3), an outlet (8) to discharge the fluid out of the cavity (3), and a needle (9) with a piercing tip (90), the needle (9) being associated with the dispenser body (2) so as to be moveable between a retracted position in which the piercing tip (90) is positioned within the cavity (3) and an extended position in which the piercing tip (90) protrudes out of the cavity (3) via the opening (4). The invention is further directed to a beverage production device comprising the beverage dispenser connector (1), a liquid supply (201), a gas supply (202), and a discharge section (203). Further, the present invention is directed to a method for beverage production with the beverage production device (200).

10 Claims, 4 Drawing Sheets

Figure 1:
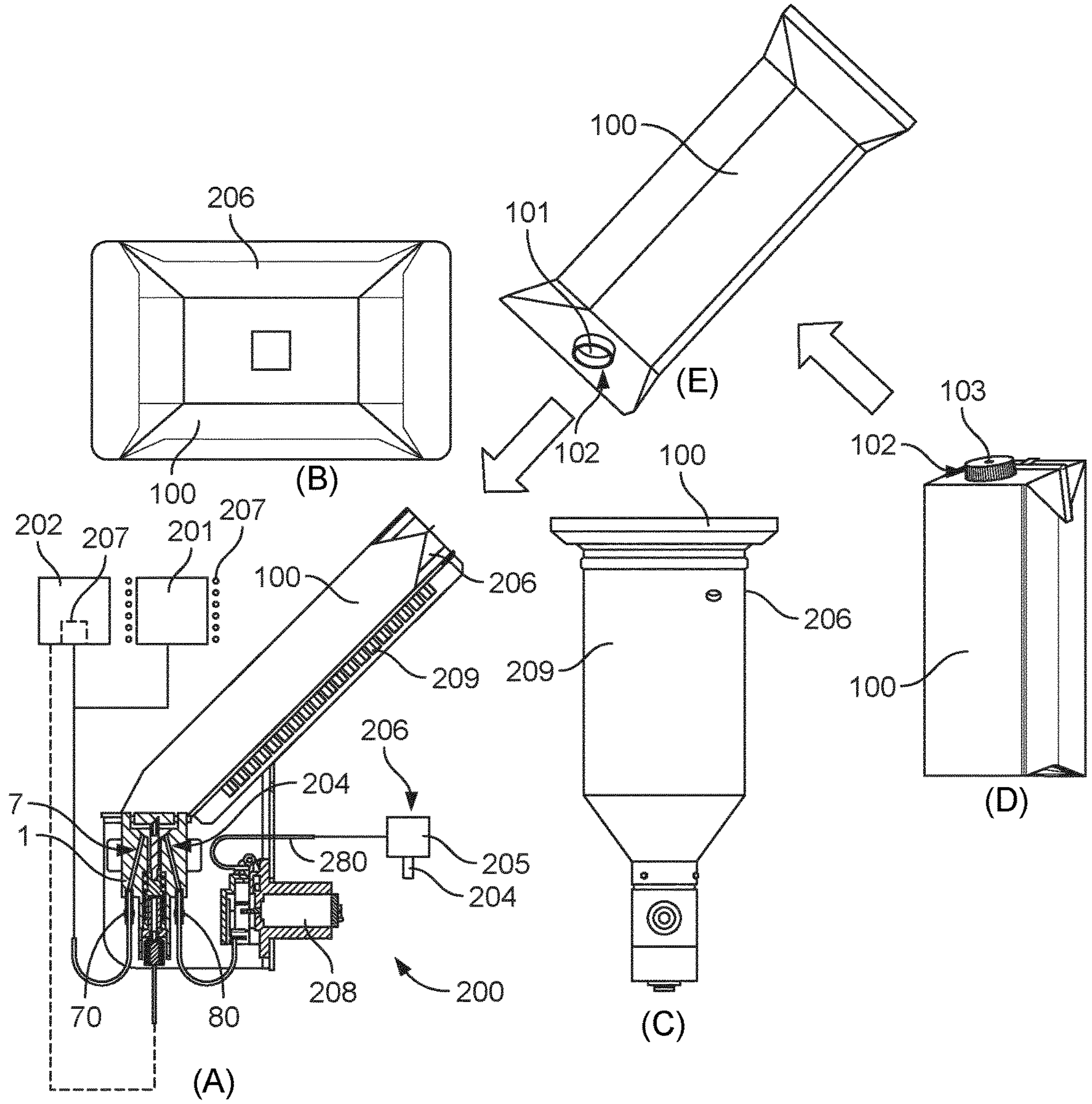

(52) U.S. Cl.
CPC ................ *B67D 2001/0095* (2013.01); *B67D 2001/075* (2013.01); *B67D 2210/00013* (2013.01)

(56) References Cited

U.S. PATENT DOCUMENTS

| | | | | |
|---|---|---|---|---|
| 2005/0121464 | A1* | 6/2005 | Miller ................ | B65D 11/1873 222/81 |
| 2008/0061081 | A1* | 3/2008 | Guerrero .................. | B67D 1/07 222/148 |
| 2015/0272379 | A1* | 10/2015 | Perentes .............. | B65D 65/466 99/295 |
| 2016/0023880 | A1* | 1/2016 | Forte ........................ | B67D 1/10 134/22.18 |
| 2018/0362326 | A1* | 12/2018 | Jarrousse ............. | B67D 3/0032 |
| 2021/0307555 | A1* | 10/2021 | Melville, Jr. ........ | B67D 1/0046 |
| 2023/0146755 | A1* | 5/2023 | Pugliese .............. | B67D 1/0895 222/129.1 |
| 2023/0242392 | A1* | 8/2023 | Pugliese .............. | B67D 3/0012 222/173 |

FOREIGN PATENT DOCUMENTS

| | | |
|---|---|---|
| JP | 3164948 | 12/2010 |
| JP | 2015030495 | 2/2015 |
| WO | 2006013715 | 2/2006 |

* cited by examiner

BEVERAGE DISPENSER CONNECTOR, BEVERAGE PRODUCTION DEVICE AND METHOD FOR BEVERAGE PRODUCTION

CROSS REFERENCE TO RELATED APPLICATIONS

The present application is a National Stage of International Application No. PCT/EP2021/057336, filed on Mar. 23, 2021, which claims priority to European Patent Application No. 20166172.5, filed on Mar. 27, 2020, the entire contents of which are being incorporated herein by reference.

1. FIELD OF THE INVENTION

The present invention is directed to a beverage dispenser connector to be connected to a container for dispensing a beverage ingredient out of the container, a beverage production device comprising the beverage dispenser connector as well as corresponding liquid and gas supplies and a discharge section for discharging a beverage ingredient as well as a method for beverage production using the beverage production device according to the present invention.

2. TECHNICAL BACKGROUND

Connectors to be connected to a beverage container for discharging a beverage ingredient contained in the container out of said container are well known in the prior art. Usually, such connectors are connected to pipes downstream the container for allowing a fluid flow of the beverage ingredient to be dispensed and transferred via the pipes. Such a connection is commonly known, e.g., in vending machines or soda dispensers.

From high-end restaurants to crowded bars to small town diners, serving ice-cold-beverages is easily obtainable by corresponding soda dispensers. This kind of machines are often equipped with so-called back-in-boxes (BIB) filled with beverage ingredients, like flavours or other additives, often containing a high amount of sugar (like syrups) or preservatives to ensure a decent shelf-life. The main bacterial source requesting the use of preservatives is located around the containers delivery section (e.g. spout) and the external surfaces of the container, e.g. the back-in-box. Even though the product itself is usually stable and aseptically filled in the container, bacteria sitting on the external surfaces of the container can be pushed into the product during opening of the container by a corresponding connector thus unfavourably promoting growth of the bacteria due to, e.g., sugar-based products within the container.

Hence, a connector usually requires trained people to connect the connector to the product container without any bacterial or viral contamination. This operation requires a cleaning procedure using chemical products, which may be complex and risky to handle.

There do also exist expensive single use connector parts to address the hygienic challenges related to the connection between the pipes and the product container. For most of the vending machines, trained people and technician have to take care of these spare part's replacement in order to ensure customer's safety with no microbiological growth in the product. This intervention is quite expensive and thus hardly sustainable.

3. SUMMARY OF THE INVENTION

It is thus an object of the present invention to provide a corresponding beverage dispenser connector as well as a beverage production device having such a connector and a method for producing a beverage, which allow for an easy and safe connection of a corresponding product (e.g. beverage ingredient) container.

This object is achieved by the subject-matter of the independent claims. The dependent claims study further the central idea of the present invention.

According to a first aspect, the present invention is directed to a beverage dispenser connector comprising a dispenser body defining a cavity with an opening to be open at a side of the dispenser body, a connection section to attach the dispenser body with the open cavity (i.e. with the opening) over a delivery section of a container to close the cavity with the delivery section, an inlet to deliver a fluid into the cavity, an outlet to discharge the fluid out of the cavity, and a needle with a piercing tip, wherein the needle is associated with the dispenser body so as to be movable between a retracted position in which the piercing tip is positioned within the cavity and an extended position in which the piercing tip (at least partially) protrudes out of the cavity via the opening.

With such a beverage dispenser connector it is possible to allow for a sufficient sanitization of both the connectors needle, namely its piercing tip, as well as a corresponding area facing a delivery section of a container to be connected by the connector to thus allow for a safe decontamination of a corresponding opening area of a container before the movable needle, after being decontaminated, protrudes out of the cavity via the opening and thus into the container connected thereto. Hence, a bacterial or viral contamination of the product inside the container can be securely avoided. The provision of the dedicated inlet and outlet allows for a secure and easy transfer of a corresponding sanitizing liquid/fluid, which further facilitates the connector itself while increasing its sanitization function.

The inlet preferably extends at least partially through the dispenser body. Likewise, the outlet preferably extends at least partially through the dispenser body. Hence, the inlet and/or the outlet can be provided in an easy manner directly within the dispenser body, which further facilitates the layout and production of the connector. Also, the corresponding inlet and outlet are securely provided and allow for an easy external connection of corresponding supplies as will be described herein below.

The inlet comprises an inlet connection section for connecting an inlet line. The outlet may also comprise an outlet connection section for connecting an outlet line. Such a connection section can be any kind of port, neck, fitting, adapter for frictional connection and/or form fit to thus easily connect any corresponding supply lines, i.e. inlet and outlet lines, respectively. The connection section may comprise a snap-action connection, a screw connection, a bayonet connection and the like.

The beverage dispenser connector may further comprise a triggering section for selectively moving the needle between the retractor position and the extended position. The triggering section may be positioned at an end of the needle being opposite to the piercing tip or between said end of the needle and the piercing tip. The triggering section preferably is configured to cooperate with a pneumatic, hydraulic, electric and/or mechanic actuator for selectively moving the needle. Therefore, the triggering section preferably is part of a pneumatic and/or hydraulic cylinder, and/or a gear to be connected to an electric motor and/or a crank. In a preferred embodiment, the triggering section is thus configured to move the needle upon pneumatic or hydraulic action. Hence, by air supply (e.g. pressured air) or hydraulic supply (e.g.

pressurized water), the needle can be operated. The use of compressed fluid (gas like air, or liquid like water) for a pneumatic/hydraulic operation of the needle allows for an easy layout and operation of the beverage dispenser connector. It is, of course, also possible that the needle is operated by any other kind of actuator, e.g. an electric motor or a manually or motor-driven crank or the like.

The needle preferably comprises a sealing element for sealing off the inlet from the cavity in the extended position and allowing fluid flow from the inlet to the cavity in the retracted position. It is thus possible to selectively allow fluid flow into the cavity for sanitizing purposes in case the needle is in the retracted position and a connected container is thus not yet be opened. In the retracted position, the cavity can thus be fed with a sanitizing liquid via the inlet, while during beverage dispensing, i.e. in the extended position of the needle, the inlet is sealed off and thus separated from the cavity during drainage of the product being dispensed from the opened container.

The cavity may comprise a first ring (or cylindrical) section directly surrounding the piercing tip in the retracted position of the needle, a second ring (or cylindrical) section surrounding the first ring section preferably at a defined radius and a sanitizing space connecting the first and second ring section and being open towards the opening. Hence, a quite flat cavity can be provided which allows for a defined fluid flow when entering a fluid via the inlet to thus allow for a most effective sanitization. Preferably, the inlet directly extends into the first ring section and the outlet directly extends from the second ring section. This results in a clearly defined flow direction for an effective sanitization process.

According to another aspect, the present invention is directed to a beverage production device comprising a beverage dispenser connector according to the present invention and adapted to be connected to a delivery section of a container carrying a beverage ingredient. Further, the beverage production device comprises a liquid supply being connected with the inlet (e.g. by a hose, line, pipe, or the like) for delivering a liquid (e.g. water, sanitizing liquid) into the cavity. The beverage production device further comprises a gas supply being connected with the inlet (e.g. by a hose, line, pipe, or the like) for delivering a gas (e.g. air) into the cavity. The beverage production device further comprises a discharge section being connected with the outlet for discharging a beverage ingredient from the cavity. The discharge section comprises a discharge outlet for dispensing a beverage product.

Hence, a beverage production device can be provided which is equipped with the beverage dispenser connector according to the present invention to allow for an easy beverage production by simply integrating the beverage dispenser connector into corresponding supply system for easily discharging a corresponding beverage ingredient from a container via the cavity. Before opening the container, the beverage dispenser connector allows for an easy and safe sanitization of the needle, cavity, delivery section and preferably also the whole delivery lines up to the and including the discharge section.

The liquid supply may comprise a water supply. The water can be used for sanitizing purposes. The liquid supply may also comprise a sanitizing liquid supply, e.g. for providing a chemically based sanitization product. The gas supply may comprise an air supply, preferably a compressor. The gas can simply be air or any other kind of gas. Hence, the corresponding fluids can be easily provided and delivered through the beverage production device. The beverage production device preferably further comprises a heating element for heating up the fluid in the respective supply, i.e. in the liquid supply (e.g. the water supply, the sanitizing liquid supply) and/or the gas supply. Hence, hot water or any other kind of sanitizing liquid can be easily supplied via the inlet into the cavity for sanitizing purposes. After sanitization, the liquid is preferably evacuated by supplying gas via the gas supply into the cavity. If heated, the gas flow may dry and further sanitize the cavity even more effectively.

The discharge section may further comprise a mixing chamber being provided between the outlet and the discharge outlet for allowing a beverage product be mixed before being dispensed via the discharge outlet. Hence, the beverage production device provides means for allowing a sufficiently mixed beverage based on the beverage ingredient provided by the container to which the beverage dispenser connector is attached. The mixing chamber can preferably be connected to the liquid supply, more preferred to the water supply, and/or to an additional beverage ingredient container, preferably via a beverage dispenser connector according to the present invention. The use of a plurality of corresponding liquid/water supplies and/or additional beverage ingredient containers allows for preparation of any desired beverage product.

The beverage production device may further comprise a container holder for holding a beverage ingredient container in place to be connected with the beverage dispenser connector. The provision of a container holder allows for an easy placement and defined positioning of a corresponding beverage ingredient container in the beverage production device.

The beverage production device or its container holder may comprise a cooling section for cooling a container placed in/on/at the container holder. The additional equipment with a cooling section allows for a desired cooling of the content (i.e. beverage ingredient) of the container. Hence, the content of the container, i.e. the beverage ingredient, can be kept chilled thus reducing bacterial activity.

The beverage production device in general or the container holder in particular may further comprise a code reader—e.g. an optical reader or a wireless reader—for identifying a code carried on a beverage ingredient container preferably when or once being placed in/on/at the container holder. The use of a code reader for identifying a corresponding code on the container allows for a more sophisticated control system and procedure. Also, the device may identify the position of a corresponding beverage ingredient with respect to a particular beverage dispenser connector so that the overall beverage production can be easily controlled, e.g., automatically by simply placing the corresponding containers to the respective container holders.

According to another aspect, the present invention is further directed to a method for beverage production, which comprises the steps of:

- providing a beverage production device according to the present invention with the needle in the retracted position,
- providing a container carrying a beverage ingredient and having a delivery section being sealed with a closure (e.g. the closure can be a seal, a lid or cap, e.g., being made of plastic, a (aluminium) foil, a membrane, and the like),
- attaching the beverage dispenser connector, preferably its dispenser body, with the is open cavity (i.e. with the opening ahead) over the delivery section of the container to sealing close the cavity with the delivery section, delivering a sanitizing liquid via the inlet into the cavity and preferably out of the cavity via the outlet, after delivery of the sanitizing liquid, delivering a gas via the inlet through the cavity and out of the cavity via the outlet to drain the cavity from sanitizing liquid, after drainage of the cavity, moving the needle from the retracted position to the extended position so that the piercing tip penetrates the closure to open the container (i.e. towards the cavity), and delivering the beverage ingredient out of the container via the cavity and the outlet to the discharge section for dispensing a beverage product (i.e. based on and thus comprising the beverage ingredient).

Hence, a sanitization method is provided which ensures a proper cleaning of part (i.e. incl. the delivery section) of external surfaces of the beverage ingredient container covered by the cavity, which part is intended to be pierced to dispense the beverage ingredient after a cleaning protocol is finished. Thus, any bacteria or viruses present on this sensitive area to clean can be easily and safely removed or killed thanks to the supply of a corresponding sanitizing liquid (e.g. hot water or another sanitizing liquid) into the cavity and thus towards the sealed delivery section/closure. In a preferred embodiment, the sanitization steps can be initiated automatically once the beverage dispenser connector is attached to the container. Therefore, the beverage dispenser connector or the beverage production device may comprise a sensor for detecting the beverage dispenser connector be securely attached/locked to the corresponding container. The method can be carried out manually, semi-automatically or automatically, as desired.

The container used for the present invention can be any type of food safe container and is preferably a bag-in-box (BIB), a foldable container like a tetra based container, and the like. The beverage ingredient container preferably is a collapsible container in order to keep the aseptic characteristic of the beverage ingredient contained in the container. The container has the delivery section, preferably sealed with a closure, to be penetrated by the needle for accessing/discharging the beverage ingredient contained in the container. The delivery section is adapted to receive the beverage dispenser connector, e.g. being attached by a screw connection, snap-on connection, bayonet connection, or any other kind of form fit and/or frictional connection. The delivery section or closure is preferably selectively protected—e.g. during transportation of the container—by a removeable protection cap/lid.

The beverage ingredient carried in the container according to the present invention can be any type of beverage ingredient, from any type of liquid beverage product base to any type of additives. As non-exhaustive examples, the liquid beverage product base can be water, soda, lemonade, soup, and so on. The term "additive" mainly relates to a liquid component, or to a liquid component comprising small solid particles. However, the liquid/water supply can also be used for dissolving a solid, e.g. powdered, beverage ingredient as an additive carried in the container for discharging the so dissolved beverage ingredient. Additive may preferably be understood as designating a liquid in an amount up to 5%, preferably 0.05% to 1%, preferably 0.1% to 0.5% by volume, of the main liquid material in the final beverage product. As non-exhaustive examples, additive can be a flavour or aroma (for example orange, peach, lemon, etc.) like an edible flavouring concentrate, a tea or coffee extract, a fruit juice, a minerals mother solution, etc. The additive can be a mineral liquid concentrate, or a so-called "functional" concentrate or enhancer such as an additive comprising a vitamin, caffeine or another coffee extract. The expression "functional concentrate" refers to a product that has an effect on the consumer, such as a product that is probiotic, prophylactic, etc.

In a preferred embodiment, the inlet can be sealed from the cavity, preferably by the needle or its sealing element, when the needle is moved from the retracted position to the extended position. Hence, the corresponding movement of the needle results in a sealing of the inlet and thus additional transfer of a sanitizing liquid towards or via the cavity during dispensing of a beverage ingredient from the container can be securely avoided.

The step of providing the beverage ingredient container may comprise the step of placing the beverage ingredient container in/on/at the container holder. This preferably for cooling the beverage ingredient container and thus its contents by the cooling section of the container holder. Hence, the beverage ingredient container can be easily provided in/on/at the beverage production device, while an additional chilling of the product by use of the cooling section results in a positive effect with respect to the shelf-life of the corresponding beverage ingredient within the container. If the container holder comprises the code reader, a code carried on the beverage ingredient container can be identified, e.g., when placing the beverage ingredient container in/on/at the container holder. The data carried by the code and identified by the code reader can then be used for the beverage production in any desired way. For instance, the code may carry shelf-life data and the device may interrupt delivery of a particular container once the shelf-life exceeded. Also, the content of the container can be identified by the code and may be used for delivery of required beverage ingredients for a beverage product being requested by a consumer.

The beverage product can be mixed in the mixing chamber of the discharge section before being dispensed via the discharge outlet. Hence, a sufficiently mixed beverage product can be obtained. Preferably, water, e.g. from the water supply, and/or additional beverage ingredients are delivered to the mixing chamber to be mixed with the beverage ingredient delivered from the beverage ingredient container before being dispensed via the discharge outlet. Hence, any desired beverage product can be obtained easily on demand.

4. BRIEF DESCRIPTION OF DRAWINGS

Further features, details and advantages of the present invention will now be described with reference to the drawings of the enclosed figures.

Figure 2:
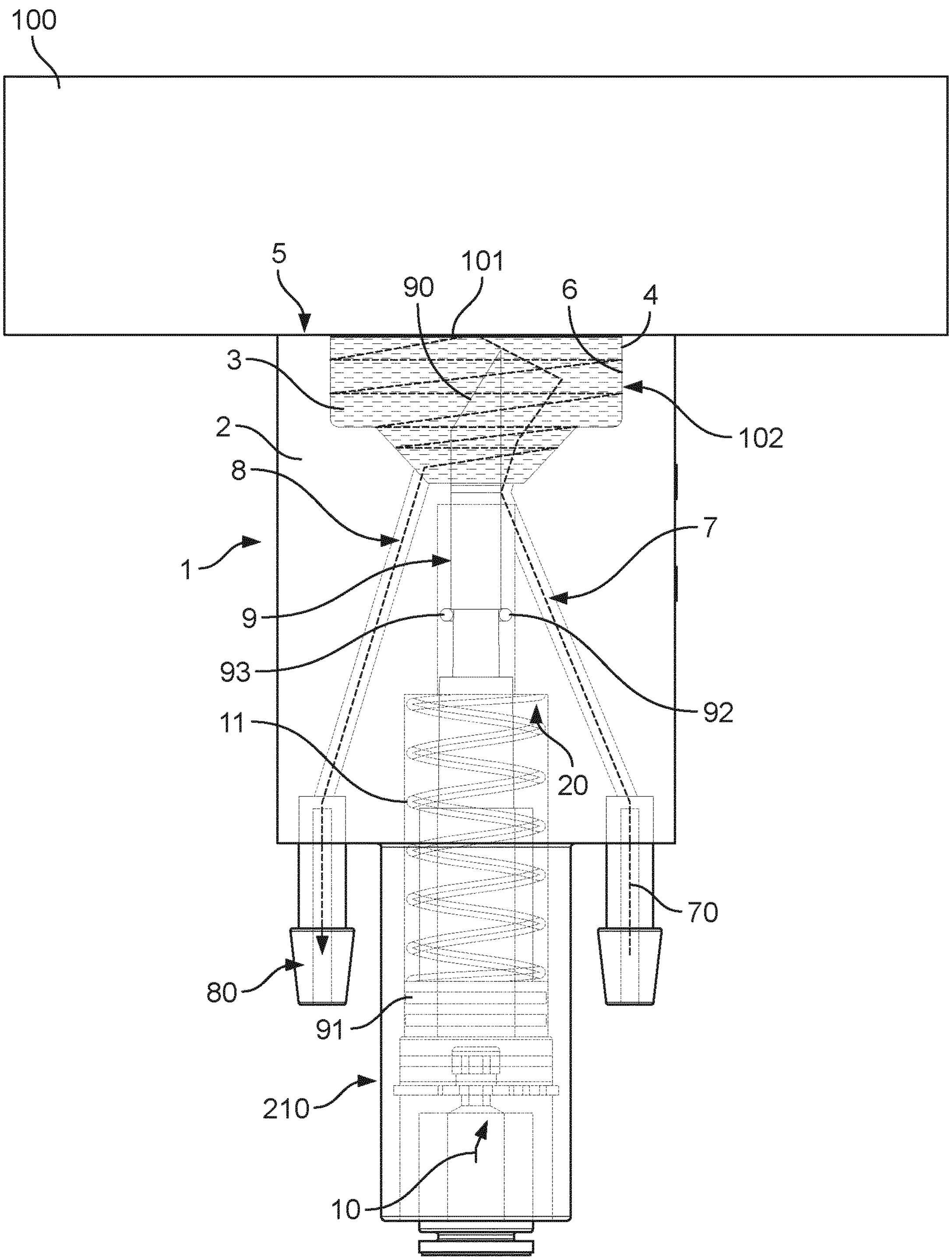
Figure 3:
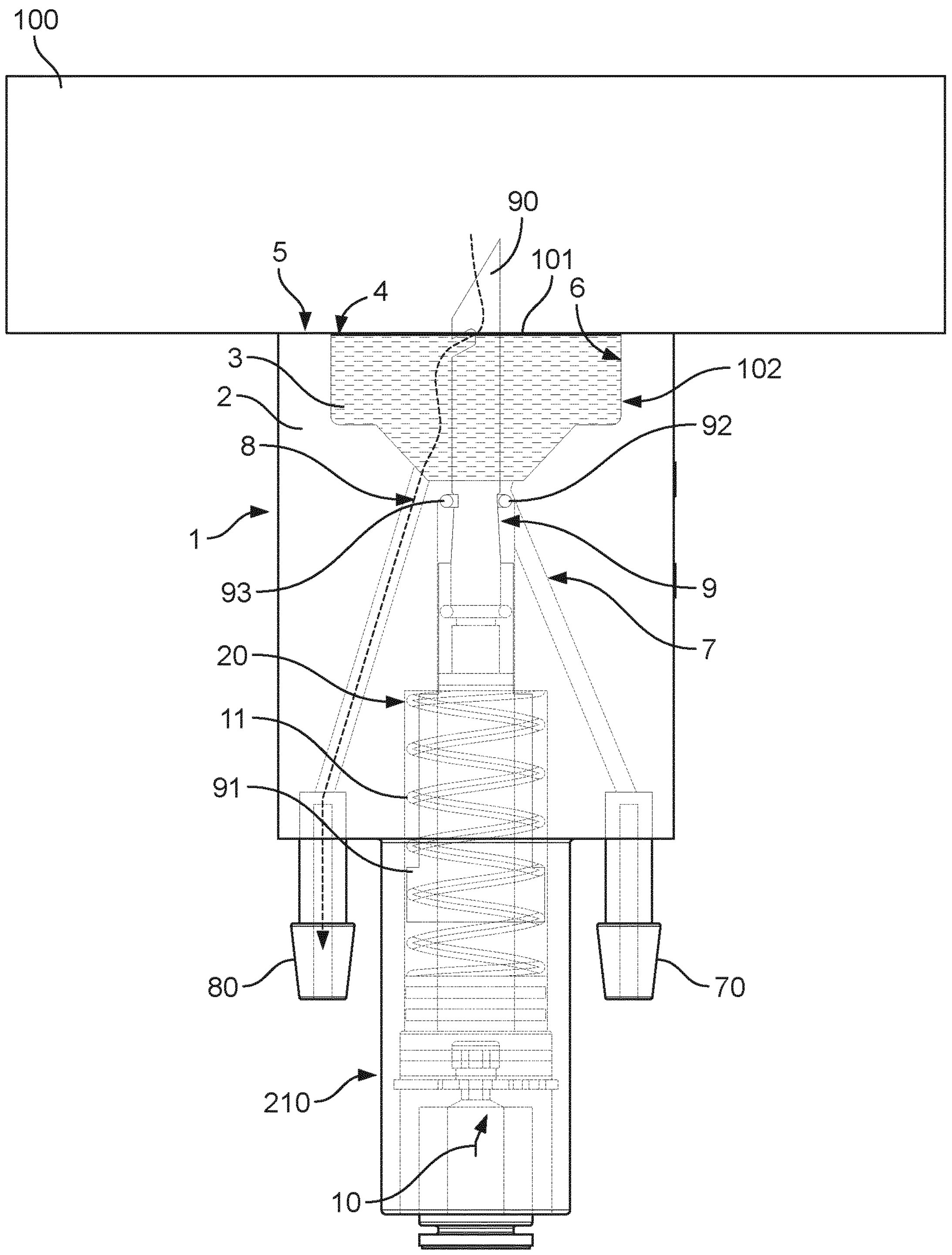
Figure 4:
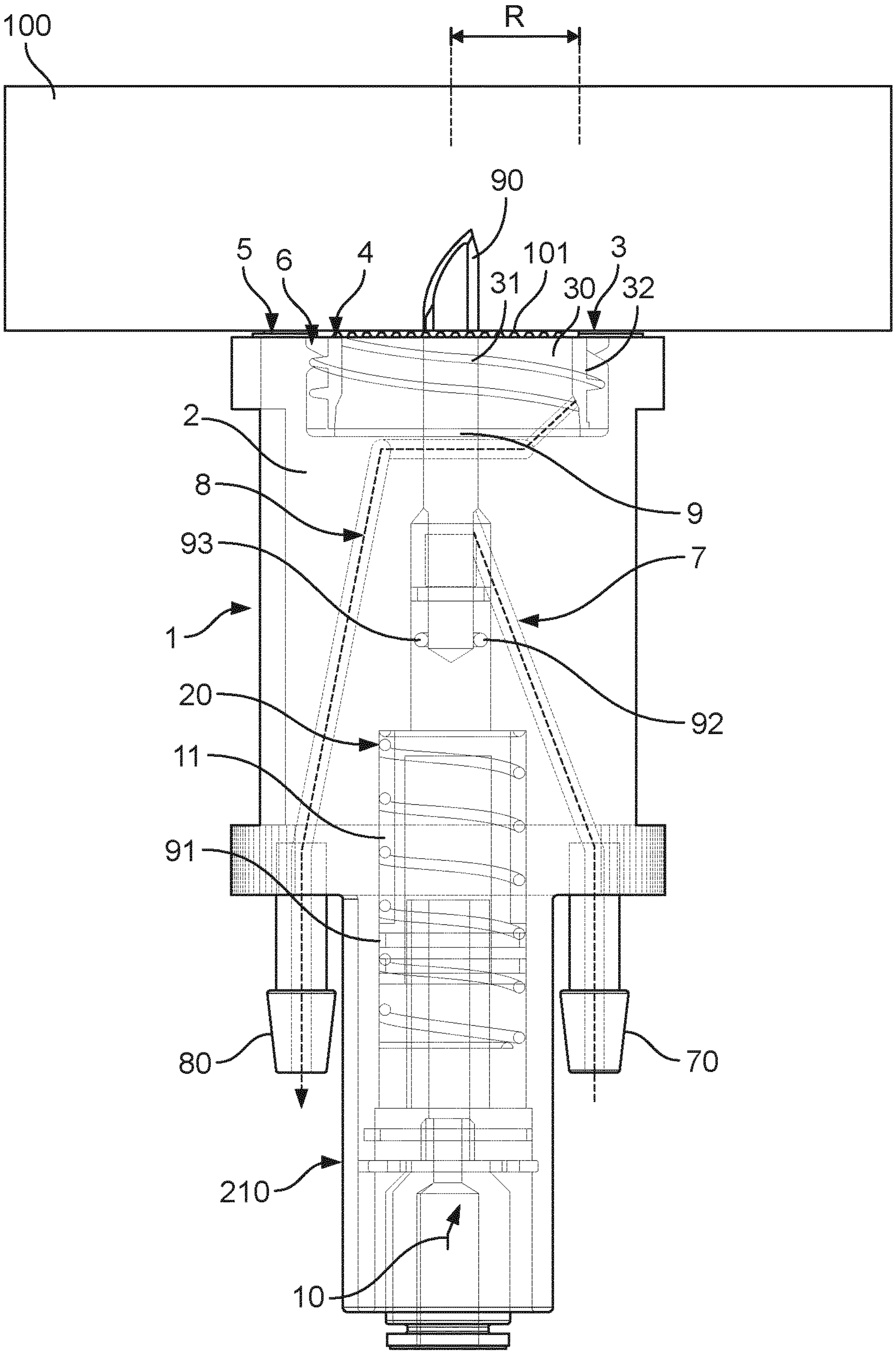

FIG. 1 shows different views of the beverage production device according to a first embodiment of the present invention in a cross-sectional side view (FIG. 1A), in a top view (FIG. 1B), in a sectional bottom view (FIG. 1C), as well as a beverage ingredient container in a folded state with protective cap (FIG. 1D) and in an unfolded operational state without protective cap (FIG. 1E), FIG. 2 shows a cross sectional side view of a beverage dispenser connector according to an embodiment of the present invention during a sanitization step, FIG. 3 shows a cross sectional side view of the beverage dispenser connector according to FIG. 2 during beverage dispensing, and FIG. 4 shows a cross sectional side view of a beverage dispenser connector according to a further embodiment of the present invention during a sanitization step.

5. DETAILED DESCRIPTION

As being apparent from the present drawings, the present invention is directed to a beverage dispenser connector 1 which can be best seen in FIGS. 2 to 4. The beverage dispenser connector 1 comprises a dispenser body 2 defining a cavity 3 with an opening 4 to be open at a side 5 of the dispenser body 2. The beverage dispenser connector 1 further comprises a connection section 6 to attach the dispenser body 2 with the open cavity 3 over a delivery section 102 of a beverage ingredient container 100 to close the cavity 3 with the delivery section 102. This can be clearly seen in FIG. 2.

Moreover, the beverage dispenser connector 1 further comprises an inlet 7 to deliver a fluid into the cavity 3, as can also be clearly seen in FIG. 2. The inlet 7 may extend at least partially through the dispenser body 2. The inlet can be formed, for instance, as an integrally formed bore within the dispenser body 2. As also shown in FIGS. 2 to 4, the inlet 7 may further comprise an inlet connection section 70 for connecting an inlet line (e.g. a hose, pipe, etc.) 270.

The beverage dispenser connector 1 further comprises an outlet 8 to discharge the fluid out of the cavity 3. The outlet 8 may extend at least partially through the dispenser body 2 in a similar manner as defined for the inlet 7 described herein above. Hence, the outlet 8 may also be provided as an integrally formed bore within the dispenser body 2. Also, the outlet 8 may comprise an outlet connection section 80 for connecting an outlet line (e.g. a hose, pipe, etc.) 280 to thus easily integrate the beverage dispenser connector 1 in a given supply system or beverage production device 200 as will be described in more detail herein below.

The beverage dispenser connector 1 further comprises a needle 9 with a piercing tip 90 at a distal end thereof. The needle 9 is associated with the dispenser body 2 so as to be moveable between a retracted position (see FIG. 2) in which the piercing tip 90 is positioned within the cavity 3, and an extended position (see FIGS. 3 and 4) in which the piercing tip 90 protrudes out of the cavity 3 via the opening 4.

As can be derived from FIGS. 2 to 4, the beverage dispenser connector 1 may further comprise a triggering section 10 for selectively moving the needle 9 between the retracted position (e.g. FIG. 2) and the extended position (e.g. FIGS. 3 and 4). As is shown in the embodiments of FIGS. 2 to 4, the triggering section 10 can be configured to cooperate with a pneumatic actuator for selectively moving the needle 9. Here, the triggering section 10 is part of a pneumatic cylinder 210 to allow for the pneumatic action be applied to the needle 9 for it to be moved. Here, the triggering section 10 is preferably positioned at an end of the needle 9 being opposite to the piercing tip 90. In FIGS. 2 to 4, this corresponding triggering section 10 is here provided at a lower portion of the needle 9 thus forming a part of a corresponding pneumatic cylinder 210. By applying compressed fluid, like compressed air, onto the triggering section 10, the needle 9 will be pushed from the retracted position (see FIG. 2) to the extended position (see FIGS. 3 and 4).

Besides the triggering section 10 being actuated pneumatically, the triggering section 10 may also be configured to cooperate with another type of actuator, e.g. a hydraulic, electric and/or mechanic actuator, for selectively moving the needle 9. The triggering section 10 may then be part of a corresponding hydraulic cylinder and/or comprises a gear to be connected to an electric motor and/or a crank. Also, the triggering section 10 does not necessarily be positioned at an end of the needle 9 being opposite to the piercing tip 90, but it can also be positioned between the said end of the needle 9 and the piercing tip 90 or at any other location of the needle 9 being advantageous for applying a corresponding force to operate—i.e. move—the needle 9.

To allow for a secure retraction of the needle 9 once the air supply or any other triggering force to move the needle 9 from the retracted position to the extended position is stopped, the needle 9 can be forced/biased towards the retracted position, e.g. by a spring element ii biased or loaded with a spring force at least during compression, i.e. when the needle 9 is moved from the retracted position to the extended position. Here, the spring element ii preferably sits between a flange section 91 of the needle 9 and an opposing stepped portion 20 in the dispenser body 2, as can be clearly seen in FIGS. 2 to 4.

As can also be clearly seen in FIGS. 2 to 4, the needle 9 may comprise a sealing element 92 for sealing off the inlet 7 from the cavity 3 in the extended position, as is clearly shown in FIGS. 3 and 4. Hence, during dispensing of a beverage ingredient from the container 100, further introduction of, e.g., a sanitizing liquid is securely avoided. Moreover, the sealing element 92 further allows fluid flow from the inlet 7 to the cavity 3 in the retracted position (see FIG. 2), as the sealing element 92—in the retracted position of the needle 9—releases the inlet 7 towards the cavity 3. The sealing element 92 may be an O-ring. The sealing element 92 may be positioned on the needle 9 and preferably partially sits in a circumferential outer groove 93 of the needle 9.

As can be derived from FIG. 4, the cavity 3 preferably comprises a first ring section 31 (here in the form of a cylindrical section) directly surrounding the piercing tip 90 in the retracted position (see FIG. 2) of the needle 9, a second ring section 32 (here in the form of a cylindrical section) surrounding the first ring section 31 preferably at a defined radius R, and a sanitizing space 30 connecting the first ring section 31 and the second ring section 32 and being open towards the opening 4, i.e. facing the container 100 or its delivery section 102 during operation. Hence, a comparably small cavity 3 can be provided which allows for a defined fluid flow during a sanitizing process (see, e.g., FIG. 4), which further ensures to avoid air bubbles being trapped within the cavity 3. In case of the embodiment as shown in FIGS. 2 and 3, air being trapped in the cavity 3 can be further avoided by the beverage dispenser connector 1 being oriented in an angled position.

The inlet 7 preferably directly extends into the first ring section 31 and the outlet 8 directly extends from the second ring section 32. This allows for a defined and thus most efficient fluid flow and secure avoidance of any air being trapped within the cavity 3. This sanitization procedure is exemplarily shown in FIG. 4.

In particular with respect to FIG. 1, the beverage dispenser connector 1 can be part of a beverage production device 200. The beverage dispenser connector 1 is then adapted to be connect to a delivery section 102 of a container 100 carrying a beverage ingredient. A liquid supply 201 is connected with the inlet 7 (e.g. via the inlet lines 270) for delivering a liquid into the cavity 3. The liquid supply 201 can comprise a water supply, preferably a hot water supply. Hence, water and preferably heated or hot water can be used as a sanitizing liquid for the beverage production device 200. The liquid supply 201 may further comprise a sanitizing liquid supply for supplying a sanitizing liquid other than (hot) water, e.g. a chemically based sanitization product/liquid.

The beverage production device 200 further comprises a gas supply 202 being connected (e.g. via the inlet lines 270) with the inlet 7 for delivering a gas like air into the cavity 3. The gas supply 202 may comprise an air supply, like a compressor or any other kind of (compressed) air supply.

The gas supply 202 may also be fluidly connected to the triggering section 10 as a pneumatic actuator for the needle 9.

The beverage production device 200 preferably further comprises a heating element 207 for heating up the fluid in the liquid supply 201 (e.g. the water supply and/or the is sanitizing liquid supply) and/or the gas supply 202.

The beverage production device 200 further comprises a discharge section 203 being connected (e.g. via the outlet lines 280) with the outlet 8 for discharging a beverage ingredient from the cavity 3. The discharge section 203 comprises a discharge outlet 204 for dispensing a beverage product.

A pump 208, like a peristaltic pump, may be provided between the beverage dispenser connector 1 and the discharge section 203, preferably integrated in-line in or with the outlet lines 280.

The discharge section 203 may preferably further comprise a mixing chamber 205 being provided between the outlet 8 and the discharge outlet 204 for allowing a beverage product be mixed before being dispensed via the discharge section 203, i.e. the discharge outlet 204. The mixing chamber 205 is preferably connected to the liquid supply 201 (e.g. the water supply) and/or additional beverage ingredient container, preferably via a beverage dispenser connector 1 according to the present invention. The connection of the liquid/water supply 201 allows for water be directly delivered to the mixing chamber 205 as a basis for a beverage product, there be mixed by a desired combination of beverage ingredients from corresponding beverage ingredient containers preferably each being connected to the delivery system, i.e. the beverage production device 200, by a corresponding beverage dispenser connector 1. Also, the direct connection of the liquid supply 201 to the mixing chamber 205 may allow for delivery of a sanitizing liquid directly into the mixing chamber 205, if desired.

The water supply may be connected to a carbonisation system to add carbon dioxide to the water be used for the beverage production.

As can be seen in FIG. 1, the beverage ingredient container wo to be used may be a foldable and preferably collapsible container boo (see FIG. 1D), the delivery section 102 of which or its closure 101 being selectively protected—e.g. during transportation of the container 100—by a removeable protection cap 103. In FIG. 1E, the container wo is shown in the unfolded operational state with the protective cap 103 be removed and thus the delivery section 102 be exposed. As mentioned, the container wo can be collapsible to keep the aseptic characteristic of the beverage ingredient contained in the container 100.

The beverage production device 200 may further comprise a container holder 206 for holding the beverage ingredient container 100 in place to be connected with the beverage dispenser connector 1. This is shown in FIG. 1A with the unfolded container wo positioned in place on the container holder 206. The beverage production device 200 or its container holder 206 may comprise a cooling section (here a cooling plate) 209 for cooling the container wo being placed in/on/at the container holder 206. Hence, the content of the container boo, i.e. the beverage ingredient, can be kept chilled thus reducing bacterial activity. Moreover, the beverage production device 200 or its container holder 206 may comprise a code reader (not shown) for identifying a code carried on a beverage ingredient container 100 preferably when being placed in/on/at the container holder 206. The code reader may be an optical reader or a wireless reader or any kind of code reader known in the prior art.

In the following, a method for beverage production will be described.

In a first step, a beverage production device 1 according to the present invention is provided with the needle 9 in the retraced position as shown, for instance, in FIG. 2.

In a second step, a container wo carrying a beverage ingredient is provided, the container wo having a delivery section 102 being sealed with a closure 101. The step of providing the beverage ingredient container wo may further comprise the step of placing the beverage ingredient container wo in/on/at the container holder 206.

Hence, the container wo can be securely hold in place, particularly with respect to the beverage dispenser connector 1. Also, preferably, the container can be positioned in the container holder 206 for cooling the beverage ingredient container 100, i.e. its contents, by the cooling section 209 of the container holder 206. Moreover, a code carried on the container 100 may be (automatically) read or identified by a code reader when the container wo is placed in/on/at the container holder 206.

In a third step, the beverage dispenser connector 1, preferably its dispenser body 2, is attached with the open cavity 3 (i.e. with the opening 4 ahead) over the delivery section 102 of the container 100 to sealingly close the cavity 3 with the delivery section 102.

In a fourth step, a sanitizing liquid is delivered via the inlet 7 into the cavity 3 and preferably out of the cavity 3 via the outlet 8. Hence, a corresponding delivery section 102 of the container is sanitized. Also, the piercing tip 90 of the needle 9 is also is sanitized as being positioned within the cavity in the retracted position of the needle 9.

In a fifth step, after delivery of the sanitizing liquid, a gas is delivered via the inlet 7 through the cavity 3 and out of the cavity 3 via the outlet 8 to drain the cavity 3 from sanitizing liquids. Steps 4 and 5 are shown exemplarily in FIGS. 2 and 4.

In a sixth step and with reference to FIG. 3, after drainage of the cavity 3, the needle 9 is moved from the retracted position to the extended position so that the piercing tip 90 penetrates the closure 101 to open the container 100. Due to the previous sanitizing step, bacterial or viral contamination of the beverage ingredient inside the container 100 can be securely avoided.

As can be seen in FIG. 3, the inlet 7 can be sealed, preferably by the needle 9 and more preferred by its sealing element 92, from the cavity 3 when being moved from the rejected position to the extended position to thus avoid further introduction of sanitizing liquids or air during beverage dispensing.

In a final step, the beverage ingredient is delivered out of the container 100 via the cavity 3 and the outlet 8 to a discharge section 203 for dispensing the beverage product. The beverage product can be mixed in the mixing chamber 205 of the discharge section 203 before being dispensed via the discharge section 203, i.e. the discharge outlet 204.

Preferably, water, e.g. from the water supply, and/or additional beverage ingredients are delivered to the mixing chamber 205 to be mixed with the beverage ingredient delivered from the beverage ingredient container wo before being dispensed via the discharge outlet 204.

The present invention is not limited to the embodiments as described herein above as long as being covered by the appended claims.

The invention claimed is:

1. A beverage dispenser connector comprising a dispenser body defining a cavity with an opening to be open at a side of the dispenser body, a connection section to attach the dispenser body with the open cavity over a delivery section of a container to close the cavity with the delivery section, an inlet to deliver a fluid into the cavity, an outlet to discharge the fluid out of the cavity, a needle with a piercing tip, the needle being associated with the dispenser body so as to be moveable between;

a retracted position in which the piercing tip is positioned within the cavity; and an extended position in which the piercing tip protrudes out of the cavity via the opening;

wherein the needle comprises a sealing element for sealing off the inlet from the cavity in the extended position and for allowing fluid flow from the inlet in the retracted position.

2. The beverage dispenser connector according to claim 1, wherein the inlet extends at least partially through the dispenser body, and the outlet extends at least partially through the dispenser body.

3. The beverage dispenser connector according to claim 1, wherein the inlet comprises an inlet connection section for connecting an inlet line, and the outlet comprises an outlet connection section for connecting an outlet line.

4. The beverage dispenser connector according to claim 1, further comprising a triggering section for selectively moving the needle between the retracted position and the extended position.

5. The beverage dispenser connector according to claim 4, wherein the triggering section selectively moves the needle.

6. The beverage dispenser connector according to claim 1, wherein the cavity comprises a first ring section directly surrounding the piercing tip in the retracted position of the needle, a second ring section surrounding the first ring section.

7. The beverage production device, comprising:

a beverage dispenser connector comprising a dispenser body defining a cavity with an opening to be open at a side of the dispenser body, a connection section to attach the dispenser body with the open cavity over a delivery section of a container to close the cavity with the delivery section, an inlet to deliver a fluid into the cavity, an outlet to discharge the fluid out of the cavity, a needle with a piercing tip, the needle being associated with the dispenser body so as to be moveable between a retracted position in which the piercing tip is positioned within the cavity and an extended position in which the piercing tip protrudes out of the cavity via the opening, adapted to be connected to a delivery section of a container carrying a beverage ingredient, a liquid supply being connected with the inlet or delivering a liquid into the cavity, a gas supply being connected with the inlet for delivering a gas into the cavity, and a discharge section being connected with the outlet for discharging a beverage ingredient from the cavity, wherein the discharge section comprises a discharge outlet for dispensing a beverage product.

8. The beverage production device according to claim 7, wherein the liquid supply comprises a water supply, and/or a sanitizing liquid supply, and wherein the gas supply comprises an air supply.

9. The beverage production device according to claim 7, wherein the discharge section further comprises a mixing chamber being provided between the outlet and the discharge outlet for allowing a beverage product to be mixed before being dispensed via the discharge outlet.

10. The beverage production device according to claim 7, further comprising a container holder for holding a beverage ingredient container in place to be connected with the beverage dispenser connector.

* * * * *